(12) United States Patent
Geier et al.

(10) Patent No.: US 7,705,170 B2
(45) Date of Patent: Apr. 27, 2010

(54) METHOD OF PREPARING FATTY ACID ALKYL ESTERS FROM WASTE OR RECYCLED FATTY ACID STOCK

(75) Inventors: Douglas F. Geier, Decatur, IL (US); Ahmad K. Hilaly, Springfield, IL (US); John G. Soper, Mt. Zion, IL (US)

(73) Assignee: Archer-Daniels-Midland Company, Decatur, IL (US)

( * ) Notice: Subject to any disclaimer, the term of this patent is extended or adjusted under 35 U.S.C. 154(b) by 911 days.

(21) Appl. No.: 11/102,869

(22) Filed: Apr. 11, 2005

(65) Prior Publication Data

US 2005/0245405 A1 Nov. 3, 2005

Related U.S. Application Data

(60) Provisional application No. 60/560,619, filed on Apr. 9, 2004.

(51) Int. Cl.
*C11C 1/00* (2006.01)
(52) U.S. Cl. ...................................... 554/167
(58) Field of Classification Search ................. 508/461; 560/129
See application file for complete search history.

(56) References Cited

U.S. PATENT DOCUMENTS

| | | | | |
|---|---|---|---|---|
| 2,812,343 | A * | 11/1957 | Cox et al. | 554/179 |
| 3,010,977 | A | 11/1961 | Eaves et al. | |
| 4,100,181 | A | 7/1978 | Phillips et al. | |
| 4,454,329 | A * | 6/1984 | Takagi et al. | 549/413 |
| 4,678,580 | A * | 7/1987 | Brady et al. | 210/490 |
| 5,362,893 | A * | 11/1994 | Muylle et al. | 554/195 |
| 5,405,992 | A | 4/1995 | Funk et al. | |
| 5,859,270 | A * | 1/1999 | Kolstad et al. | 554/204 |
| 6,166,231 | A | 12/2000 | Hoeksema | 554/12 |
| 6,399,802 | B2 * | 6/2002 | Reaney | 554/179 |
| 6,509,487 | B2 * | 1/2003 | Tatsumi et al. | 554/167 |
| 6,623,604 | B1 * | 9/2003 | Elsasser et al. | 203/46 |
| 6,723,863 | B2 | 4/2004 | Poppe et al. | |
| 6,768,015 | B1 | 7/2004 | Luxem et al. | |
| 6,797,753 | B2 | 9/2004 | Benecke et al. | |
| 2003/0078448 | A1 | 4/2003 | Buchanan et al. | |
| 2004/0054206 | A1 | 3/2004 | Brunner et al. | |
| 2005/0065357 | A1 | 3/2005 | Ergun et al. | |
| 2005/0159610 | A1 | 7/2005 | Poppe | |
| 2005/0274065 | A1 | 12/2005 | Portnoff et al. | |

FOREIGN PATENT DOCUMENTS

| | | |
|---|---|---|
| GB | 2 145 079 A | 3/1985 |
| WO | WO 90/08127 A1 | 7/1990 |
| WO | WO 03/038020 A1 | 5/2003 |
| WO | WO 03/059847 A2 | 7/2003 |
| WO | WO 03/082278 A1 | 10/2003 |

OTHER PUBLICATIONS

International Search Report for International Application No. PCT/US2005/012208, European Patent Office, Netherlands, mailed Aug. 24, 2005.
Mazzott, M., et al., "A Continuous Chromatographic Reactor: SMBR," *Chem. Eng. Sci. 51*:1827-1836, Elsevier Science Ltd. (1996).
Patnaik, P.; Potassium Carbonate; Handbook of Inorganic Chemicals; 2003; pp. 743-744; McGraw-Hill; New York, New York; USA.

* cited by examiner

*Primary Examiner*—Glenn A Caldarola
*Assistant Examiner*—Taiwo Oladapo
(74) *Attorney, Agent, or Firm*—Sterne, Kessler, Goldstein & Fox P.L.L.C.

(57) ABSTRACT

The present invention is directed to a method or preparing fatty acid alkyl esters from fatty acids contained in co-product streams, or waste or recycled fatty acid stock. The present method utilizes an acidic resin to convert the fatty acid stock into esters. The present method encompasses the use of reactive simulated moving bed chromatography, wherein above about 95 percent of the fatty acid stock is converted to fatty acid alkyl esters. The present method has been optimized to separate the ester product from the raffinate stream formed during the chromatographic process, thereby improving the yield of the esterification and preventing acid hydrolysis of the ester.

38 Claims, 3 Drawing Sheets

METHOD OF PREPARING FATTY ACID ALKYL ESTERS FROM WASTE OR RECYCLED FATTY ACID STOCK

CROSS-REFERENCE TO RELATED APPLICATIONS

This application claims benefit under 35 U.S.C. §119(e) to U.S. Provisional Application No. 60/560,619, filed Apr. 9, 2004, which is hereby incorporated herein by reference.

BACKGROUND OF THE INVENTION

1. Field of the Invention

Fatty acids contained in co-product streams, waste or recycled fatty acid stock such as soap stock can be converted into fatty acid ($C_{1-5}$) alkyl esters using an acidic resin.

2. Related Art

Fatty acid alkyl esters, such as methyl esters, find use as chemical intermediates and fuels. Fatty acid methyl esters of vegetable oil are commonly referred to as Biodiesel. Renewable resource chemicals are important as they are sustainable in contrast to those derived from fossil fuels.

Currently, Biodiesel and other fatty acid alkyl esters are often produced from refined triglyceride feedstocks via base catalyzed transesterification. When glyceride oils, e.g., animal fats or vegetable oils, are refined to remove free fatty acids and other impurities by alkali refining, the aqueous alkaline solution which is separated from the bulk of the refined oil contains alkali soaps of fatty acids together with substantial quantities of free fatty acids, glycerides thereof, and various impurities including water-soluble phosphatides such as lecithin. Some of the free fatty acids, glycerides, and impurities ordinarily will be emulsified in the resulting aqueous mixture by the soaps and the phosphatide-type components. This aqueous mixture is commonly known as "soap stock".

Alternate, less refined or recycled fatty acid feedstocks are available. These feedstocks include acidulated soap stock (acid oils), gums (phospholipid enriched by-product stream obtained in edible oil refining), used grease from restaurants, and all other acylglyceride esters of fatty acids that contain high levels of free fatty acids (FFA).

SUMMARY OF THE INVENTION

The present invention is directed to a method of preparing fatty acid alkyl esters from fatty acids contained in co-product streams, or waste or recycled fatty acid stock. The present method utilizes an acidic resin to convert the fatty acid stock into esters. The present method encompasses the use of reactive simulated moving bed chromatography, wherein above about 95 percent of the fatty acid stock is converted to fatty acid alkyl esters. The parameters of the present method can be adjusted to separate the ester product from the raffinate stream formed during the chromatographic process, thereby improving the yield of the esterification and preventing acid hydrolysis of the ester. The present method can comprise an acid wash step that further improves the yield and/or the life of the resin.

DETAILED DESCRIPTION OF THE INVENTION

Figure 1:
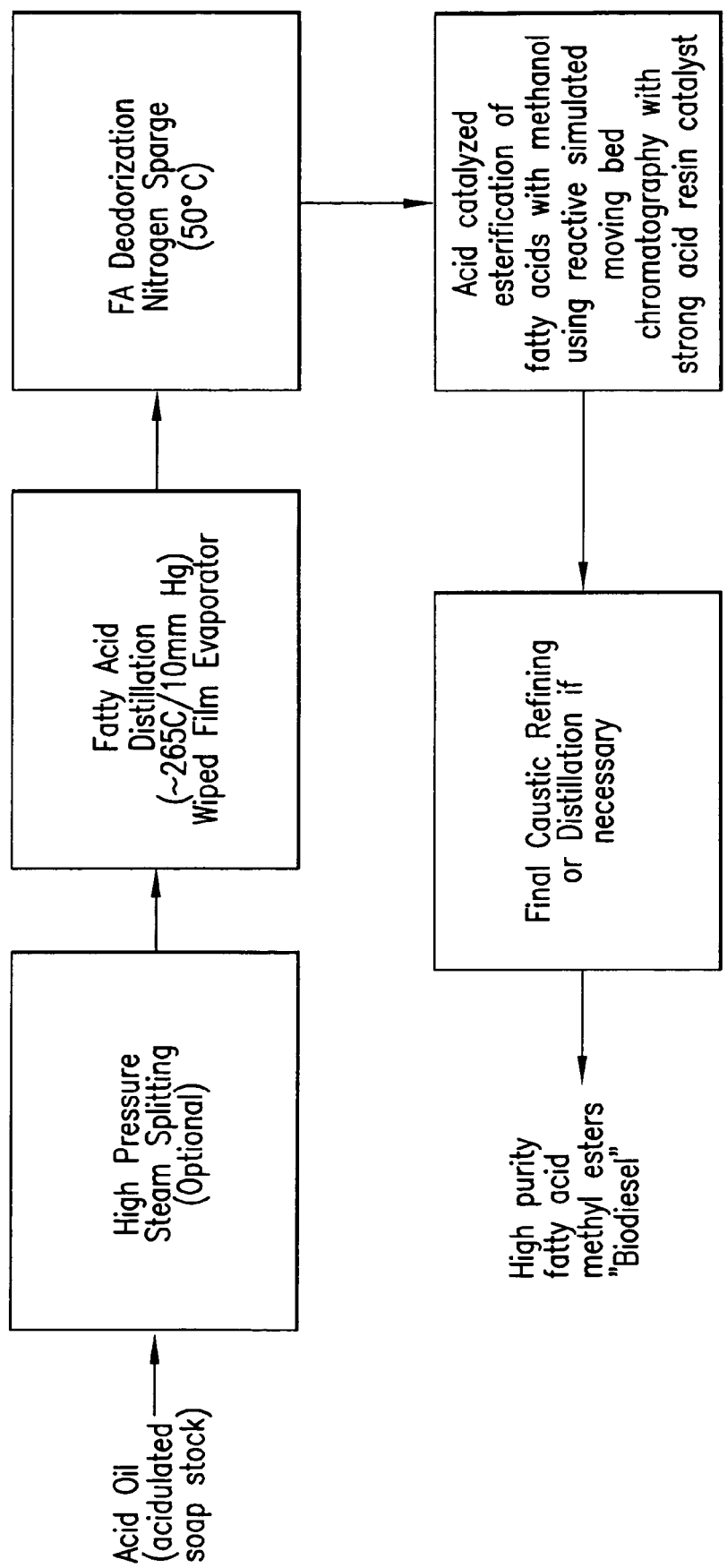
FIG. 1 depicts a process for one embodiment of the present invention. An acid wash of the acidulated soap stock or the alcohol can be added to this process at any point prior to esterification.

The present invention is directed to a method of preparing fatty acid alkyl esters from acidulated soap stock or other raw materials that contain fatty acids. Such raw materials referred to herein as fatty acid composition, fatty acid stock, soap stock, acid oil, acidulated soapstock, feed, feed material or feedstock, include any source of fatty acids such as co-product streams, waste or recycled oil or grease and the like.

In one embodiment, the present method is directed to a method of preparing a fatty acid ($C_{1-5}$) alkyl ester composition comprising, combining a fatty acid composition with a ($C_{1-5}$) alkyl alcohol in the presence of an acidic ion exchange resin, wherein prior to combining, the fatty acid composition has been subjected to one or more of the following,
  (a) distillation,
  (b) contacting with an ion exchange material and/or
  (c) contacting with an acid, and/or,
  prior to combining, the ($C_{1-5}$) alkyl alcohol has been contacted with an acid, wherein a fatty acid ($C_{1-5}$) alkyl ester composition is prepared. Steps (a), (b) and (c) can be referred to as "pre-treatment" of the feed material. Likewise, the alcohol can be pretreated by contacting with an acid prior to the step of combining with a fatty acid material in the presence of an acidic ion exchange resin. In one aspect of this embodiment, both the fatty acid composition and the ($C_{1-5}$) alkyl alcohol may be contacted with an acid as described prior to the step of combining the material and the alcohol in the presence an acidic ion exchange resin.

The present invention can employ a distilling step prior to combining the fatty acid stock with an alcohol according to the method. In this embodiment, the method specifically encompasses combining a distilled fatty acid stock with an appropriate alcohol, wherein this alcohol can be an acid-contacted alcohol. The distillation technique can be any distillation known in the art. The temperature during the distillation can be any temperature and pressure that is effective in distilling fatty acids. A skilled artisan would easily determine such an effective temperature and pressure. Preferably, the temperature/pressure is in a range from about 265° C. at about 15 mbar to about 150° C. at about 0.3 mbar. Preferably, the distillation technique is performed on a Wiped Film Evaporator.

The wiped film technique can be used to minimize any cis/trans isomerization that may occur during the distillation. This is useful whenever it is desirable to prepare a final ester product that has the same cis/trans ratio as the starting feedstock. For example, if the ester product is to be used during food processing, it is desirable to use a product that contains a low amount of trans fatty acids. Such a low amount would be at or near the level of a raw vegetable oil. A distillation step can also be utilized to lower the peroxide value of the fatty acid feed stock. If the source is used grease recovered from a restaurant, such a grease may have been oxidized during its use and can possess a high peroxide value. In this case, distilling the fatty acids prior to esterification is useful in lowering the peroxide value. This step is not a required step, but it can be incorporated into the any embodiment of the present method when, for instance, a low peroxide value feedstock is desirable.

Alternatively, the present invention may employ an ion exchange step prior to combining the fatty acid stock with an alcohol according to the method. Useful exchange resins include strong acid cation resins, preferably in the hydrogen form. These useful exchange resins include Dowex 88, Bayer Lewatit S2568 and Finex GC 480. Macroporous resins are especially useful. A skilled artisan will be able to determine the rate at which the feed can be passed through the resin. Feed rates of about 0.375 bed volumes (BV) per hour gave suitable results.

The present invention can employ a step of acid washing. A concentration of acid as low as 1% HCl in water has been shown to be an efficacious acid wash solution, although lower acid concentrations readily determined by experiment can achieve the same effect. Stronger acid solutions may also be employed as long as the combination of acid strength, time and temperature of treatment do not promote deterioration of the fatty acid stock. When dilute acid solutions, such as 1% HCl are employed, equal parts by volume of an aqueous solution of HCl (1%) and fatty acid feed may be used. If stronger acids are used, a smaller volume of acid wash may be used. A suitable treatment combination comprises ten minutes of incubation of acid wash solution and fatty acid stock at about 55° C. Following this incubation, the acid washing solution is separated from the acid contacted fatty acid stock by any suitable means including, but not limited to, membrane separation, centrifugation or gravity separation followed by decantation.

In all embodiments of the present invention, an alcohol is combined with the fatty acid feedstock. Preferably, the alcohol is a $(C_{1-5})$ alkyl alcohol. More preferably, the alcohol is butanol, propanol, ethanol or methanol. Most preferably, the alcohol is methanol. It is preferred that the alcohol have a low percentage of water because water can facilitate the hydrolysis of the ester product. A preferred grade of methanol is about 99.5% methanol as supplied by chemical companies. The methanol recovered from the present method can be collected and separated by suitable means such as with a distillation column or pervaporation. The purification of methanol obtained in a typical industrial distillation is about 99.5%.

In a most preferred embodiment, the alcohol is contacted with an acid prior to combining with a fatty acid feedstock. The acid can be any mineral acid or organic acid or mixture thereof. Preferred acids include hydrochloric acid, phosphoric acid, sulfuric acid and citric acid. Most preferably, the alcohol combined with the fatty acid feedstock is an acid-contacted methanol. Preferred acid concentrations are not less than about 0.05%. The upper limit of the acid concentration may only be limited by the tolerance of the resin to the acid. Preferably, the concentration is from about 0.05% to about 20%. More preferably, the concentration is from about 0.1% to about 10%. Most preferably, the concentration is from about 0.1% to about 0.5% In this most preferred concentration, the concentration is about 0.1% by volume, and the alcohol is methanol.

The present method is useful for producing $(C_{1-5})$ alkyl esters wherein the source of the $(C_{1-5})$ alkyl moiety is the alcohol. Thus, in a preferred embodiment, the ester is a butyl, propyl, ethyl or methyl ester of a fatty acid. Most preferably, the ester is a methyl ester of a fatty acid. More preferably, the methyl ester is a monoester.

An advantage of using one or more of the pre-treatment steps described herein is that the resin life, i.e., the duration of catalytic efficiency can be prolonged. Catalytic efficiency describes the resin's rate of converting starting materials to $(C_{1-5})$ alkyl esters. These conversion rates are known or are easily determined for each resin suitable for use in the present method. As the resin is used, the conversion rate will decrease over time. The decrease in catalytic activity can be attributed to many factors. However, it has been found that the rate of decrease of catalytic activity of a resin can be significantly slowed or halted when using one or more starting materials that have been pre-treated as described herein. Pre-treating the fatty acid composition with an ion exchange step prior to combining the composition with an alcohol in the presence of an acidic ion exchange resin results in the prolonging of the resin life by not less than about 30%. Preferably, the pretreatment will result in a prolonging of the resin life by not less than about 50%. Pre-treating the fatty acid composition with an ion exchange step and pre-treating the alcohol by contacting with an acid results in an even greater prolonging of the resin life.

In a preferred embodiment, the present method utilizes reactive simulated moving bed chromatography. In this method, a synthetic reaction and separation of reaction products occur in a continuous manner in a single system. That is, reactant feeds are fed to a Reactive Simulated Moving Bed Chromatography apparatus; a reaction in the apparatus converts the reactant feeds into two or more reaction products or a desired reaction product and reaction by-product(s); separation steps within the apparatus allow reaction products to be separated into the desired reaction product and reaction by-products; the desired reaction product is eluted from the apparatus in a continuous manner and the reaction by-products are separately eluted from the apparatus. In a suitable apparatus, an array of chromatographic beds, columns or parts thereof is aligned in a series wherein a fatty acid stock in the presence of an alcohol flows through any number of chromatographic devices. The desired product comprising fatty acid $(C_{1-5})$ alkyl ester(s) can be eluted from the series at any point through an outlet. Preferably, parameters such as feed rate of the fatty acid feedstock, alcohol flow rate, desorbent rate, reload rate and step time can be adjusted independently to improve the reaction yield. Further, as disclosed herein adjusting the parameters can facilitate elution of the desired product from the by-products (also called the raffinate) stream. The raffinate comprises by-products such as water formed during the combination of the alcohol and the fatty acid to produce the ester product. In the presence of acid, a reverse reaction can occur wherein water can hydrolize the ester to form an alcohol and a fatty acid. Thus, the present method can avoid the problem of lower yields due to acid hydrolysis of the ester. Removal of the raffinate stream also facilitates recycling of the alcohol.

In the present method, the reactive simulated moving bed chromatography apparatus can comprise one or more zones. A zone is defined by the primary function of the chromatographic beds, columns or parts thereof. In a preferred embodiment, the present method utilizes four zones, wherein each zone comprises one or more chromatographic devices. In certain embodiments, one or more of the described zones can be replaced or eliminated, where, for example, the reload zone is not used if the process does not recycle the mobile phase. In a preferred embodiment the column configuration is 1-2-2-5; where the 1 indicates 1 column in the reload zone, the first 2 indicates 2 columns in the regeneration zone, the second 2 indicates 2 columns in the desorption zone, and the 5 indicates 5 columns in the reaction zone. In another preferred embodiment the column configuration is 1-2-3-4 indicated as above. Other suitable column configurations are readily discernable to one of ordinary skill in reactive simulated moving bed chromatography.

In the reaction zone, a resin is contacted with a fatty acid feed and alcohol mixture. The reaction zone comprises any number of chromatographic devices. The product stream eluting from a chromatographic device in the reaction zone can be collected or can be contacted with the resin contained in another chromatographic device in the series, wherein the effluent from this chromatographic device can be collected or further contacted with resins in the series.

After the product is removed as an eluate, the effluent is essentially a mobile phase that can be recycled by contacting the mobile phase with a resin in the series. In this process the mobile phase is contacted with one or more chromatographic beds, columns or parts thereof that comprise a reload zone. The effluent from this zone is then combined with alcohol.

The alcohol mixture is contacted with one or more chromatographic beds, columns or parts thereof that comprise a solvent regeneration zone. In this zone, the raffinate stream is separated from the mobile phase. The raffinate stream can be separated from the mobile phase which contains primarily the alcohol to be combined with the fatty acid. When the mobile phase is sufficiently separated from the raffinate stream, the mobile phase enters the desorption zone.

The desorption zone comprises one or more chromatographic beds, columns or parts thereof wherein the mobile phase is contacted with the resin in the chromatographic devices. The mobile phase containing primarily alcohol elutes through the desorption zone and is combined with a fatty acid feed, wherein the mixture enters the reaction zone as described above.

Thus, in one preferred embodiment the reactive simulated moving bed chromatography comprises in sequence: a reaction zone, a desorption zone, a solvent regeneration zone and a reload zone. Reactive simulated moving bed chromatography can be operated continuously to produce the desired alkyl esters.

Figure 2:
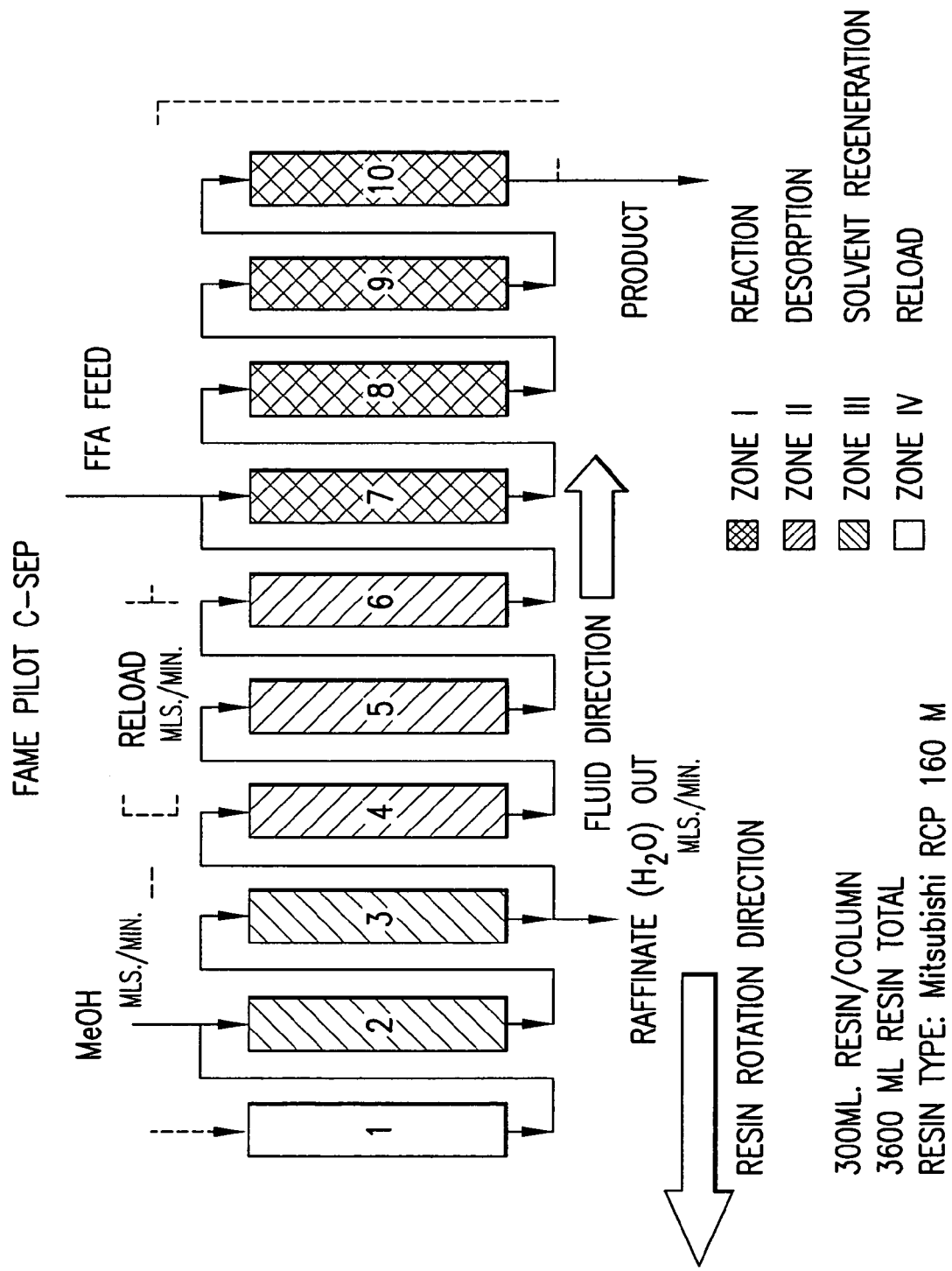
FIG. 2 depicts a reactive simulated moving bed chromatography series comprising ten chromatographic devices and four zones.

The number of chromatographic beds, columns or parts thereof contained in the series can be unlimited. The present method produces a fatty acid ($C_{1-5}$) alkyl ester, and the method can be optimized using the parameters stated above to improve product yield. Another variable useful for optimizing the present method is the number of chromatographic devices used in the series. Within the series, each zone can have an optimized number of chromatographic devices. Thus, the present method is no way limited to a certain number of chromatographic devices. Within the series of chromatographic devices, there are one or more zones as described above. Each zone contains an independent number of chromatographic devices. It has been discovered that an optimized series contains about ten chromatographic devices on a pilot scale. Within this series it has been determined that there are at least four zones as described above. Each zone can contain an independent number of chromatographic devices. The preferred embodiment is not limited to any number of chromatographic devices because the method is amenable to commercial scale use, wherein the process parameters are easily scalable by one of ordinary skill in the art. One of the parameters is the unlimited number of chromatographic devices in a series and the number within each zone in the series. One suitable arrangement of reactive simulated moving bed chromatography zones is presented in FIG. 2.

In all embodiments, the resin is an acidic resin. Preferably, the resin is a sulfonated polystyrene resin. Preferably, the resin is selected from the group consisting of CT151 Purolite, CT175 Purolite, Amberlyst 36 wet Rohm & Haas, RAD/F Mitsubishi, RCP Mitsubishi, Lewatit K2629 Sybron, and Lewatit K2621 Sybron. Most preferably, the resin is RCP Mitsubishi, such as RCP 160M, or Lewatit K2629 Sybron.

The present method can efficiently convert fatty acids to esters wherein the parameters described above and exemplified herein can be adjusted to increase the conversion and the percent yield of esters. Preferably, at least about 90 percent of fatty acids are converted to fatty acid ($C_{1-5}$) alkyl esters. More preferably, the present method converts at least about 95 percent of fatty acids to fatty acid ($C_{1-5}$) alkyl esters. In a most preferred rate of conversion, the present method converts at least about 98 percent of fatty acids to fatty acid ($C_{1-5}$) alkyl esters. The present method can yield an ester composition comprising at least about 70% monoesters. More preferably, the ester composition comprises at least about 85% monoesters. Most preferably, the ester composition comprises at least about 95% monoesters.

In another embodiment, the present invention is directed to a method of preparing a fatty acid ($C_{1-5}$) alkyl ester composition comprising, combining an acidulated soap stock with a ($C_{1-5}$) alkyl alcohol in the presence of an acidic ion exchange resin, wherein prior to combining, said soap stock has been subjected to one or more of the following, (a) distillation, (b) contacting with an ion exchange material, and/or (c) contacting with an acid, and/or, prior to combining, said ($C_{1-5}$) alkyl alcohol has been contacted with an acid, wherein a fatty acid ($C_{1-5}$) alkyl ester composition is prepared. In one aspect of this embodiment, both the acidulated soap stock and the ($C_{1-5}$) alkyl alcohol may be contacted with an acid as described prior to the step of combining the soap stock and the alcohol in the presence an acidic ion exchange resin.

The present invention can employ a distilling step prior to combining the acidulated soap stock with an alcohol according to the method. In this embodiment, the method specifically encompasses combining a distilled fatty acid soap stock with an appropriate alcohol. The distillation technique can be any distillation known in the art and can be conducted under conditions known in the art or specifically described above. Preferably, the distillation technique is performed on a Wiped Film Evaporator.

As explained above, the wiped film technique can be used to minimize any cis/trans isomerization that may occur during the distillation, and also to lower the peroxide value. This step is not a required step, but it can be incorporated into the any embodiment of the present method when, for instance, a low peroxide value soap stock is desirable.

Alternatively, as described above, the present invention may employ an ion exchange step prior to combining the acidulated acid soap stock with an alcohol. This step can be combined with a step of contacting with an ion exchange resin prior to combining with a fatty acid stock.

In another alternative, the present invention may employ an acid washing step prior to combining the acidulated soapstock with an alcohol. This acid treatment is fundamentally different from the acidulation step used to produce acidulated soapstock from soapstock, which may contain about 50% water. The acidulation of soapstock takes place in the aqueous medium and requires acid to neutralize the caustic used to generate soapstock (pH is usually 9-10, but can be as high as 12). The fats are liberated from the emulsion to form a lipid phase comprising fatty acids and partial glycerides. The acid wash step is a separate acidulation and takes place on the lipid phase. The term acidulated soapstock is synonymous with acid oil.

In this embodiment of the present invention, an alcohol is combined with an acidulated soap stock. Preferably, the alcohol is a ($C_{1-5}$) alkyl alcohol. More preferably, the alcohol is butanol, propanol, ethanol or methanol. Most preferably, the alcohol is methanol.

In a most preferred embodiment, the alcohol is contacted with an acid prior to combining with a fatty acid feedstock. The acid can be any mineral acid or organic acid or mixture thereof. Preferred acids include hydrochloric acid, phosphoric acid, sulfuric acid and citric acid. Most preferably, the alcohol combined with the acidulated soap stock is an acid-contacted methanol solution.

The present method is useful for producing ($C_{1-5}$) alkyl esters wherein the source of the ($C_{1-5}$) alkyl moiety is the alcohol. Thus, in a preferred embodiment, the ester is a butyl, propyl, ethyl or methyl ester of a fatty acid. Most preferably, the ester is a methyl monoester of a fatty acid.

In a preferred embodiment, the present method utilizes reactive simulated moving bed chromatography, which is detailed above. In this embodiment, the method can be employed under the same guidelines as above.

In the present method, the reactive simulated moving bed chromatography can comprise one or more zones as defined above.

In all embodiments, the resin is an acidic resin. Preferably, the resin is a sulfonated polystyrene resin. Preferably, the resin is selected from the group consisting of CT151 Purolite, CT175 Purolite, Amberlyst 36 wet Rohm & Haas, RAD/F Mitsubishi, RCP Mitsubishi, Lewatit K2629 Sybron, and Lewatit K2621 Sybron. Most preferably, the resin is RCP Mitsubishi, such as RCP 160M, or Lewatit K2629 Sybron.

The present method can efficiently convert fatty acids to esters wherein the parameters described above and exemplified herein can be adjusted to increase the conversion and the percent yield of esters. Preferably, at least about 90 percent of fatty acids are converted to fatty acid ($C_{1-5}$) alkyl esters. More preferably, the present method converts at least about 95 percent of fatty acids to fatty acid ($C_{1-5}$) alkyl esters. In a most preferred rate of conversion, the present method has been shown to convert at least about 98 percent of fatty acids to fatty acid ($C_{1-5}$) alkyl esters. The present method can yield an ester composition comprising at least about 70% monoesters. More preferably, the ester composition comprises at least about 85% monoesters. Most preferably, the ester composition comprises at least about 95% monoesters.

The present invention is also directed to a method, further comprising a high pressure steam splitting of the soap stock prior to distilling. The fatty acid content of oils can be increased by high pressure steam splitting of the soap stock before fatty acid distillation. Thus, the steam splitting step can increase the percent of fatty acids in the soap stock.

The present invention is also directed to a method, further comprising deodorizing the distilled fatty acid prior to combination with the ($C_{1-5}$) alkyl alcohol. This step can be accomplished by any means known in the art for deodorizing oils such as sparging or carbon treatment.

The present invention is also directed to subjecting the fatty acid ($C_{1-5}$) alkyl ester composition product to caustic refining or distillation.

The present invention is also directed to any one of the above methods, wherein the process is sequential or continuous. Preferably, any of the above methods of the present method is conducted as a continuous process.

EXAMPLES

Example 1

Distillation of Acidulated Soap Stock

Canola oil based acidulated soap stock (~40% free fatty acid) was distilled using a wiped-film evaporator. The distillation was carried out at 265° C. at ~10 mmHg. The distillation gave ~40% distillate and ~60% residue. Cis-trans isomerization was minimized during distillation with the use of short residence times in the wiped film evaporator. The compositions of the distillate and residue are shown below under Tables 1 and 2. Acid oil can be pre-dried to remove residual water.

TABLE 1

Fatty Acid Profile

| | Date | |
|---|---|---|
| | Jan. 30, 2004 | Jan. 30, 2004 |
| Sample Id | Acid Oil Distillate | Acid Oil Residue |
| File Name | PB-0353-01 | PB-0353-02 |
| Myristic C14:0 | 0.26 | 0.14 |
| Palmitic C16:0 | 7.41 | 4.58 |
| Palmitoleic C16:1 | 0.47 | 0.23 |
| Heptadecanoic C17:0 | 0.22 | |
| Stearic C18:0 | 3.94 | 2.84 |
| Elaidic C18:1n9t | 0.27 | |
| Oleic C18:1n9c | 54.24 | 60.31 |
| Linoleic C18:2cc | 21.23 | 19.84 |
| Arachidic C20:0 | 0.72 | 0.79 |
| Eicosenoic C20:1c | 0.71 | 1.01 |
| Linolenic C18:3n3c | 5.43 | 6.02 |
| Behenic C22:0 | 0.37 | 0.60 |
| Lignoceric C24:0 | 0.23 | 0.52 |
| Nervonic C24:1 | | 0.19 |
| Total Trans FAs | 0.97 | 1.01 |
| Total C18:1 trans FAs | 0.27 | 0.00 |
| Total C18:1 cis FAs | 58.58 | 63.23 |
| Total C18:2 trans FAs | 0.00 | 0.00 |
| Total C18:2 cis FAs | 21.23 | 19.84 |
| Total C18:3 trans FAs | 0.71 | 1.01 |
| Total C18:3 cis FAs | 5.43 | 6.02 |
| Total Saturated FAs | 12.92 | 8.95 |
| Total C16:0 FA | 7.41 | 4.58 |
| Total C18:0 FA | 3.94 | 2.84 |

TABLE 2

Glyceride Analysis

| | Sample Id | |
|---|---|---|
| | Acid Oil Distillate | Acid Oil Residue |
| File Name | PB-0353-01 | PB-0353-02 |
| monoglycerides | 4.90 | 1.73 |
| diglycerides | 0.12 | 17.71 |
| triglycerides | 0.00 | 60.44 |
| glycerol | 0.28 | 0.02 |
| Free fatty acids | 90.78 | 3.08 |

The distillate also contained residual water present in the acid oil starting material.

Example 2

Distillation of Acidulated Soap Stock

Soy/Coconut oil based acidulated soap stock (~30% free fatty acid) was distilled using a wiped-film evaporator. The distillation was carried out at 265° C. at ~10 mmHg. The distillation gave ~30% distillate and ~70% residue. The compositions of the distillate and residue are shown below in Tables 3 and 4.

TABLE 3

Glyceride Analysis

| | Sample Id | |
|---|---|---|
| | SBO/CNO acid oil distillate | SBO/CNO acid oil residue |
| File Name | CD-0641-01 | CD-0641-02 |
| glycerol | 0.318 | N/D |
| total free fatty acids | 85.795 | 3.314 |
| FAME | N/D | N/D |
| monoglycerides | 2.208 | 1.192 |
| diglycerides | 0.058 | 21.633 |
| triglycerides | N/D | 63.030 |

The distillate also contained residual water present in the acid oil starting material.

TABLE 4

Fatty Acid Profile

| | Sample Id | |
|---|---|---|
| | SBO/CNO Acid Oil Distillate | SBO/CNO Acid Oil Residue |
| File Name | CD-0641-Distillate | CD-O641-Residue |
| Caproic C6:0 | 0.13 | 0.20 |
| Caprylic C8:0 | 2.38 | 2.23 |
| Capric C10:0 | 2.25 | 1.58 |
| Undecanoic C11:0 | 0.78 | |
| Lauric C12:0 | 21.17 | 12.39 |
| Myristic C14:0 | 10.70 | 4.62 |
| Palmitic C16:0 | 14.56 | 10.18 |
| Stearic C18:0 | 5.10 | 5.16 |
| Elaidic C18:1n9t | | 2.00 |
| Oleic C18:1n9c | 14.60 | 18.04 |
| Linoelaidic C18:2tt | | 0.10 |
| C18:2 9c12t | | 0.09 |
| Linoleic C18:cc | 23.60 | 35.29 |
| Arachidic C20:0 | 0.20 | 0.29 |
| Eicosenoic C20:1c | 0.08 | 0.12 |
| Linolenic C18:3n3c | 3.15 | 4.34 |
| Behenic C22:0 | 0.16 | 0.37 |
| Lignoceric C24:0 | | 0.21 |
| Total Trans FAs | 0.00 | 2.82 |
| Total C18:1 trans FAs | 0.00 | 2.63 |
| Total C18:1 cis FAs | 15.75 | 20.19 |
| Total C18:2 trans FAs | 0.00 | 0.19 |
| Total C18:2 cis FAs | 23.60 | 35.29 |
| Total C18:3 trans FAs | 0.00 | 0.00 |
| Total C18:3 cis FAs | 3.15 | 4.34 |
| Total Saturated FAs | 57.43 | 37.03 |

TABLE 4-continued

Fatty Acid Profile

| | Sample Id | |
|---|---|---|
| | SBO/CNO Acid Oil Distillate | SBO/CNO Acid Oil Residue |
| Total C16:0 FA | 14.56 | 10.18 |
| Total C18:0 FA | 5.10 | 5.16 |

Example 3

High-Pressure Steam Splitting and Distillation of Acidulated Soap Stock

Approximately 350 mL of acidulated soap stock (canola, ~40% FFA) was added with 350 mL of distilled water to a 1L stainless steel reaction vessel. The vessel was sealed and heated to 260° C. for 5 hours with vigorous agitation. The pressure was ~500 psig. The reaction mixture was cooled to room temperature. Two layers (oil and water) were present in the final reaction mixture. The layers were separated in a separatory funnel. The oil layer was dried under vacuum to remove residual moisture. The free fatty acids in the final product were increased to greater than about 70 percent. This product was then distilled at 265° C. at ~6.5 mmHg to remove free fatty acids.

Example 4

Deodorization of Distilled Fatty Acids from Acid Oils

Fatty acid distillate from Example 1 contained foul odors. The odiferous compounds in the acidulated soap stock accumulated in the acid oil distillate. The distilled fatty acids were placed in a round bottom flask equipped with mechanical agitation and a nitrogen sparge. The fatty acids were heated to ~50° C. and purged with nitrogen. After purging, the odor of the distilled fatty acids was greatly reduced. Other process such as carbon treatment, adsorbant resins and other deodorization techniques known to those skilled in the art could also be employed.

Example 5

Conversion of Free Fatty Acids to Fatty Acid Methyl Esters

Various strong acid (sulfonated) ion exchange resins were tested for conversion of fatty acids to fatty acid methyl esters in methanol. Distilled methyl esters were used in pulse tests to determine conversion of fatty acid to fatty acid methyl esters. Resins were packed in 50 mL columns with anhydrous methanol at 60° C. High conversion of fatty acid to methyl ester was achieved in the pulse test (>95% conversion with RPC resin).

The pulse test was run by loading a column with catalytic resin followed by contacting the resin with methanol. A feed stock pulse was contacted with the resin and methanol. The product was eluted with methanol and analyzed. The results are shown below in Table 5.

Resins: CT151 (Purolite), CT 175 (Purolite), Amberlyst 36 wet (Rohm & Haas), RAD/F (Mitsubishi), RCP (Mitsubishi), Lewatit K2629 (Sybron Chemicals, Inc.), and Lewatit K2621 (Sybron Chemicals, Inc.).

TABLE 5

| | Resin | | | | | | |
|---|---|---|---|---|---|---|---|
| | CT 151 | CT 175 | 36 WET | RAD/F | RCP | L2629 | L2621 |
| Total free fatty acids | 18.31 | 32.49 | 13.49 | 0.85 | 0.48 | 1.72 | 3.29 |
| Total free fatty acid methyl esters | 76.66 | 62.07 | 81.96 | 94.84 | 95.38 | 94.69 | 92.64 |
| monoglycerides | 2.15 | 2.50 | 1.94 | 1.87 | 1.50 | 1.40 | 1.75 |
| diglycerides | 2.66 | 2.73 | 2.56 | 2.43 | 2.53 | 2.19 | 2.31 |
| triglycerides | N/D | N/D | N/D | N/D | N/D | N/D | N/D |

Example 6

Reactive Simulated Moving Bed (R-SMB) Chromatography for Conversion of Free Fatty Acids to Fatty Acid Methyl Esters The starting feed material was a free fatty acid co-product stream with the following composition (Table 6):

TABLE 6

| Glycerol | 0.01 |
|---|---|
| Total free fatty acids | 85.31 |
| Monoglycerides | 4.76 |
| Diglycerides | 1.46 |
| Triglycerides | 2.12 |

The system comprised a ten column (300 ml resin/column) R-SMB unit employing the Mitsubishi RCP 160M resin. The system utilized a four zone configuration where the number of columns per zone has been optimized. The system parameters are as follows (Table 7):

TABLE 7

| Temperature: | 60 deg C. |
|---|---|
| Feed Rate: | 7 mls/min |
| Methanol rate: | 24 mls/min |
| Desorbent rate: | 16 mls/min |
| Reload rate: | 10 mls/min |
| Step Time: | 10 minutes |

The results are as follows (Table 8):

TABLE 8

| Conversion (By acid value): | 99.7% |
|---|---|
| Yield (product mass/total mass out) | 98.2% |
| Accountability (mass out/mass in) | 99.5% |

Example 7

Equal parts by volume of an aqueous solution of HCl (1%) and fatty acid feed were mixed in a heated vessel at 55° C. After 10 minutes of mixing, the material was centrifuged. The light fraction (washed fatty acid feed) was separated from the heavy fraction (primarily water and salt) and the sodium in the resulting feed fraction dropped from 537 ppm Na to 7 ppm.

Example 8

Methyl Ester Conversion by Reactive Simulated Moving Bed (RSMB) Technology

Lewatit K2629 Sybron resin was installed in the RSMB unit. The influents were 99+% methanol and a fatty acid co-product stream from the production of rapeseed oil fatty acid methyl esters. The composition of the feed material is as follows (Table 9):

TABLE 9

| Glycerol | 0.31% |
|---|---|
| Total free fatty acids | 72.10% |
| Monoglycerides | 1.56% |
| Diglycerides | 0.07% |
| Triglycerides | 0.09% |

After operating the RSMB unit for 2-3 runs; runs varied from 5-18 hours each, the catalytic efficiency of the unit had diminished. A feed rate of only about 60% of the initial rate maintained the original level of production of FAME.

To improve the rate of product formation, product yield and resin life, prior to introducing the feed material to the Reactive Simulated Moving Bed apparatus (RSMB), the feed material was contacted with a cation exchange resin (Dowex 88) The ion exchange resins were used to prepare 50 bed volumes of feed material each. After ion exchange, the sodium content of the feed material measured about 2 ppm, from an initial value of about 500-700 ppm. This feed was run through the RSMB unit and the initial results were 99+% conversion. Further, the resin life (duration of catalytic efficiency) was increased by approximately 50%.

Example 9

Effect of Acid Wash of the Alcohol Influent

Figure 3:
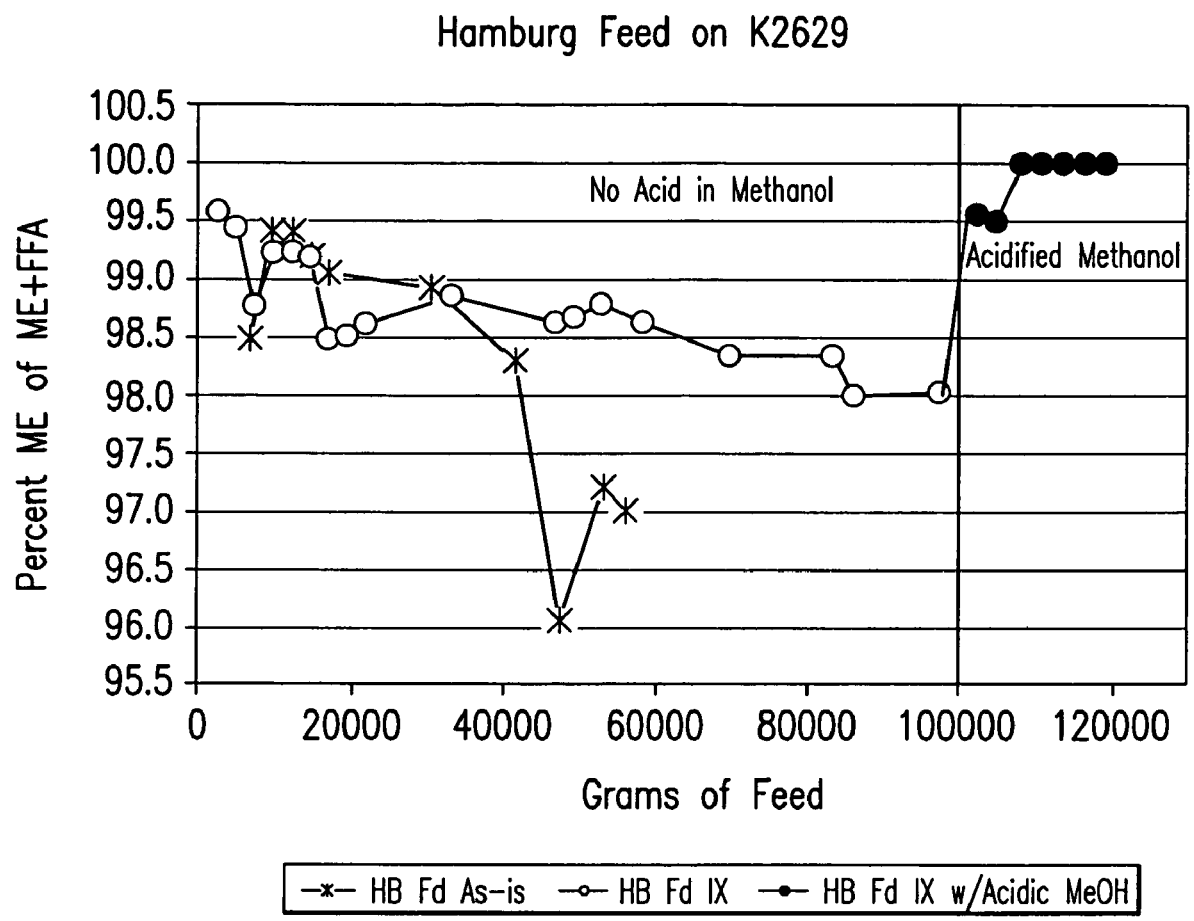
FIG. 3 depicts a graph showing ester formation using: 1. a neat fatty acid feed material (*); 2. the same neat feed material having undergone ion exchange pre-treatment (○); and 3. the same neat feed material having undergone ion exchange pre-treatment and using acidified methanol (●).

A 0.1% solution of HCl in methanol was prepared and introduced to the RSMB described in Example 8 with a fatty acid feed stock comprising fatty acid material having undergone ion exchange pre-treatment as in Example 8. The results are shown in FIG. 3. FIG. 3 depicts a graph showing ester formation using: 1. a neat fatty acid feed material (*); 2. the same neat feed material having undergone ion exchange pre-treatment (○); and 3. the same neat feed material having undergone ion exchange pre-treatment and using acidified methanol (●).

The conversion increased to 99.5% after 2 runs. By the third run, the conversion increased to 99.9%. The data also show that the conversion rate remained at this level for at least 4 additional runs. Thus, the resin life (duration of catalytic efficiency) is prolonged even further when using an ion-exchanged pre-treated feed material and an acid contacted alcohol. The raffinate generated from this embodiment can be darker in color than that in other embodiments that do not utilize an acid alcohol.

Having now fully described this invention, it will be understood to those of ordinary skill in the art that the same can be performed within a wide and equivalent range of conditions, formulations, and other parameters without affecting the scope of the invention or any embodiment thereof.

What is claimed is:

1. A method of preparing a fatty acid ($C_{1-5}$) alkyl ester composition comprising:
    contacting a ($C_{1-5}$) alkyl alcohol with solution of acid to obtain an acidified ($C_{1-5}$) alkyl alcohol solution; and,
    combining a fatty acid composition with the acidified ($C_{1-5}$) alkyl alcohol solution in the presence of an acidic ion exchange resin,
    wherein the fatty acid composition is selected from the group consisting of acid oil, acidulated soapstock, free fatty acids, fatty acid co-product, and combinations of any thereof.

2. The method of claim 1, further comprising: washing the fatty acid composition with an acid wash solution in an acid wash step, distilling the fatty acid composition, or both acid washing and distilling the fatty acid composition.

3. The method of claim 1, wherein the ($C_{1-5}$) alkyl alcohol is butanol, propanol, ethanol, methanol, or combinations of any thereof.

4. The method of claim 1, wherein the ($C_{1-5}$) alkyl alcohol is methanol.

5. The method of claim 1, wherein the combining is on one or more chromatographic beds, columns or parts thereof.

6. The method of claim 5, wherein the one or more chromatographic beds, columns or parts thereof form or provide one or more functionally distinct zones in which the method is performed.

7. The method of claim 6, wherein a reaction zone, a desorption zone, a solvent regeneration zone and a reload zone are provided, each zone being defined by one or more chromatographic beds, columns or parts thereof whose primary function corresponds to the respective zone's function.

8. The method of claim 7, further comprising eluting the fatty acid ($C_{1-5}$) alkyl esters from the one or more chromatographic beds, columns or parts thereof in the reaction zone.

9. The method of claim 8, further comprising eluting a raffinate stream from the one or more chromatographic beds, columns or parts thereof in the solvent regeneration zone.

10. The method of claim 7, wherein the acidic ion exchange resin is a sulfonated polystyrene divinyl benzene resin.

11. The method of claim 2 wherein the fatty acid composition is washed with the acid wash solution, and then is separated from the acid wash solution.

12. The method of claim 2, wherein the acid wash solution comprises a mineral acid.

13. The method of claim 12, wherein the mineral acid is selected from the group consisting of hydrochloric avid, phosphoric acid, sulfuric acid, and combinations of any thereof.

14. The method of claim 1, wherein the ($C_{1-5}$) alkyl alcohol is acidified with an acid solution prepared from mineral acids, organic acids, and combinations of any thereof.

15. The method of claim 14, wherein the acid solution is a solution of hydrochloric acid, phosphoric acid, sulfuric acid, or of combinations of any thereof.

16. The method of claim 15, wherein the acid in the acidified alcohol solution comprises from 0.05% to 20% liquid acid concentration by volume.

17. The method of claim 16, wherein the acid in the acidified alcohol solution comprises from 0.05% to 10% liquid acid concentration by volume.

18. The method of claim 17, wherein the acid in the acidified alcohol solution comprises from 0.05% to 0.5% liquid acid concentration by volume.

19. The method of claim 18, wherein the acidified alcohol solution comprises methanol.

20. The method of claim 1, wherein at least 90 percent of the fatty acids in the fatty acid composition are converted to fatty acid ($C_{1-5}$) alkyl esters.

21. The method of claim 1, wherein at least 95 percent of the fatty acids in the fatty acid composition are converted to fatty acid ($C_{1-5}$) alkyl esters.

22. The method of claim 1, wherein at least 98 percent of the fatty acids in the fatty acid composition are converted to fatty acid ($C_{1-5}$) alkyl esters.

23. The method of claim 1, wherein the fatty acid ($C_{1-5}$) alkyl ester composition comprises at least 75% fatty acid ($C_{1-5}$) alkyl monoesters.

24. The method of claim 1, wherein the fatty acid ($C_{1-5}$) alkyl ester composition comprises at least 85% fatty acid ($C_{1-5}$) alkyl monoesters.

25. The method of claim 1, wherein the fatty acid ($C_{1-5}$) alkyl ester composition comprises at least 95% fatty acid ($C_{1-5}$) alkyl monoesters.

26. The method of claim 1, further comprising, caustic refining or distilling the fatty acid ($C_{1-5}$) alkyl ester composition.

27. The method of claim 1, wherein the method is a continuous method.

28. The method of claim 1, wherein the solution of acid further comprises water.

29. The method of claim 28, wherein the solution of acid is about 1% acid by volume.

30. The method of claim 28, wherein the solution of acid is greater than about 1% acid by volume.

31. The method of claim 2, wherein the fatty acid composition is selected from the group consisting of free fatty acids, acid oil, acidulated soapstock, gums, grease, waste oil, recycled oil, and combinations of any thereof.

32. The method of claim 2, wherein the acid wash solution comprises an organic acid.

33. The method of claim 32, wherein the acid wash solution comprises citric acid.

34. The method of claim 2, wherein the acid wash solution further comprises water.

35. The method of claim 34, wherein the acid wash solution is about 1% acid by volume.

36. The method of claim 34, wherein the acid wash solution is greater than about 1% acid by volume.

37. The method of claim 34, wherein the fatty acid composition is subjected to high pressure steam splitting, distilling, and deodorizing.

38. A method of preparing a fatty acid methyl ester composition comprising:
    adding a solution of acid to a (C1-5) alkyl alcohol to obtain an acidified alcohol;

contacting a fatty acid composition with a cation exchange resin, thus reducing a sodium content of the fatty acid composition, and producing an ion exchange pre-treated fatty acid composition;

passing the acidified alcohol into a solvent regeneration zone of a reactive simulated moving bed chromatography apparatus containing an acidic ion exchange resin, thus contacting the acidified alcohol with the acidic ion exchange resin;

contacting the ion exchange pre-treated fatty acid composition with the acidified alcohol and the acidic ion exchange resin in the reactive simulated moving bed chromatography apparatus by passing the ion exchange pre-treated fatty acid composition into a reaction zone of the reactive simulated moving bed chromatography apparatus;

separating a fatty acid methyl ester composition reaction product from a reaction by-product within the reactive simulated moving bed chromatography apparatus; and, eluting the fatty acid methyl ester composition from the reaction zone of the reactive simulated moving bed chromatography apparatus.

\* \* \* \* \*